(12) United States Patent
Chu et al.

(10) Patent No.: US 8,084,158 B2
(45) Date of Patent: Dec. 27, 2011

(54) BATTERY TAB LOCATION DESIGN AND METHOD OF CONSTRUCTION

(75) Inventors: Andrew C. Chu, Cambridge, MA (US); Antoni S. Gozdz, Marlborough, MA (US); Gilbert N. Riley, Jr., Marlborough, MA (US); C. Michael Hoff, Boxborough, MA (US)

(73) Assignee: A123 Systems, Inc., Waltham, MA (US)

( * ) Notice: Subject to any disclaimer, the term of this patent is extended or adjusted under 35 U.S.C. 154(b) by 1091 days.

(21) Appl. No.: 11/748,286

(22) Filed: May 14, 2007

(65) Prior Publication Data

US 2007/0269685 A1  Nov. 22, 2007

Related U.S. Application Data

(63) Continuation-in-part of application No. 11/515,597, filed on Sep. 5, 2006, now Pat. No. 7,927,732.

(60) Provisional application No. 60/799,873, filed on May 12, 2006, provisional application No. 60/714,171, filed on Sep. 2, 2005.

(51) Int. Cl.
   H01M 2/26  (2006.01)
   H01M 2/20  (2006.01)
   H01M 4/66  (2006.01)
(52) U.S. Cl. ........... 429/211; 429/161; 429/94; 429/164
(58) Field of Classification Search .................. None
   See application file for complete search history.

(56) References Cited

U.S. PATENT DOCUMENTS

| | | |
|---|---|---|
| 3,823,040 A | 7/1974 | Jagid |
| 4,383,013 A | 5/1983 | Bindin et al. |
| 4,400,415 A | 8/1983 | Kessler et al. |
| 4,966,822 A | 10/1990 | Johnston |
| 5,464,705 A | 11/1995 | Wainwright |
| 5,554,459 A | 9/1996 | Gozdz et al. |
| 5,773,164 A | 6/1998 | Venkatesan et al. |
| 5,834,133 A | 11/1998 | Narukawa et al. |
| 5,866,274 A | 2/1999 | Mawston et al. |

(Continued)

FOREIGN PATENT DOCUMENTS

EP  0771040 A2  5/1997

(Continued)

OTHER PUBLICATIONS

International Search Report, International Application No. PCT/US2006/34478, mailed Aug. 13, 2007. (1 Page).

(Continued)

*Primary Examiner* — Keith Walker
(74) *Attorney, Agent, or Firm* — Wilmer Cutler Pickering Hale and Dorr LLP

(57) ABSTRACT

A compact, robust, multifunctional and highly manufacturable rechargeable cylindrical electrochemical cell is provided. In some embodiments, a cell can include a spirally wound assembly having an anode sheet and a cathode sheet separated by separator membranes, each sheet having a electroactive layer on a current collector. At least one of the current collectors can be in electrical communication with conducting tabs that extend from at least one of the anode sheet and the cathode sheet, the conducting tabs extends from an end face of the spirally wound assembly. The centers of the plurality of conducting tabs can be located within a 90 degree quadrant of an end face of the spirally wound assembly.

26 Claims, 9 Drawing Sheets

U.S. PATENT DOCUMENTS

| | | | |
|---|---|---|---|
| 5,876,237 | A | 3/1999 | Patel et al. |
| 6,071,638 | A * | 6/2000 | Fradin ............... 429/211 |
| 6,080,506 | A | 6/2000 | Davis et al. |
| 6,083,639 | A | 7/2000 | McHugh et al. |
| 6,159,253 | A | 12/2000 | Lund |
| 6,197,074 | B1 | 3/2001 | Satou et al. |
| 6,344,292 | B1 | 2/2002 | Nemoto et al. |
| 6,432,574 | B1 | 8/2002 | Suzuki et al. |
| 6,521,374 | B1 | 2/2003 | Nakanishi et al. |
| 6,673,128 | B2 | 1/2004 | Payne et al. |
| RE38,518 | E | 5/2004 | Tucholski |
| 6,780,303 | B2 | 8/2004 | Colombier |
| 6,875,540 | B2 | 4/2005 | Nemoto et al. |
| 6,884,541 | B2 | 4/2005 | Enomoto et al. |
| 7,033,697 | B2 | 4/2006 | Park et al. |
| 7,927,732 | B2 | 4/2011 | Myerberg et al. |
| 2001/0038945 | A1 * | 11/2001 | Kitoh et al. ............... 429/211 |
| 2003/0035993 | A1 | 2/2003 | Enomoto et al. |
| 2003/0091893 | A1 | 5/2003 | Kishiyama et al. |
| 2003/0175587 | A1 | 9/2003 | Okutani et al. |
| 2003/0194601 | A1 | 10/2003 | Lei |
| 2003/0211388 | A1 | 11/2003 | Ruth et al. |
| 2004/0023108 | A1 | 2/2004 | Nakanishi et al. |
| 2004/0121230 | A1 | 6/2004 | Fong et al. |
| 2004/0157115 | A1 | 8/2004 | Bouffard et al. |
| 2004/0157120 | A1 | 8/2004 | Wu |
| 2004/0214076 | A1 | 10/2004 | Tsukamoto et al. |
| 2004/0237290 | A1 | 12/2004 | Ura |
| 2004/0265683 | A1 | 12/2004 | Merrill et al. |
| 2005/0255378 | A1 | 11/2005 | Knight et al. |
| 2006/0124973 | A1 | 6/2006 | Arai et al. |
| 2006/0172190 | A1 | 8/2006 | Kaplin et al. |
| 2007/0117011 | A1 | 5/2007 | Myerberg et al. |
| 2009/0109099 | A1 | 4/2009 | Jang et al. |

FOREIGN PATENT DOCUMENTS

WO  WO-2005/076936  8/2005

OTHER PUBLICATIONS

Supplementary European Search Report for European Patent Application No. 06814143.1 mailed May 9, 2011. 11 pages.

* cited by examiner

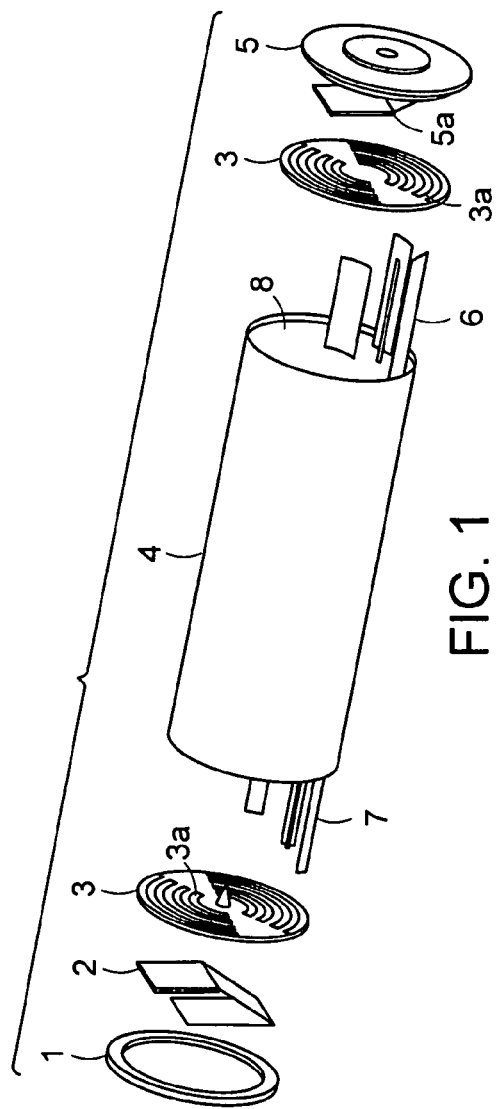
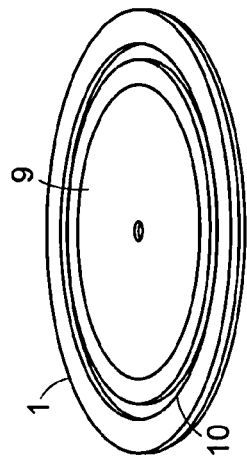
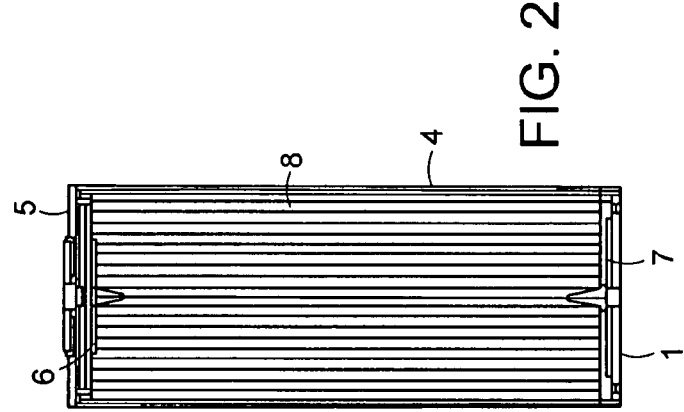
FIG. 1
FIG. 2
FIG. 3

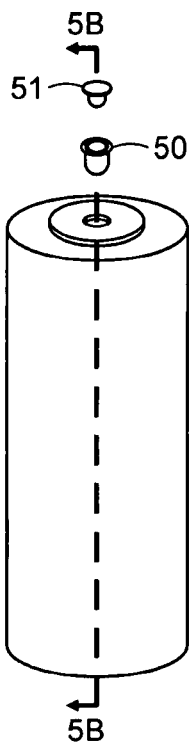
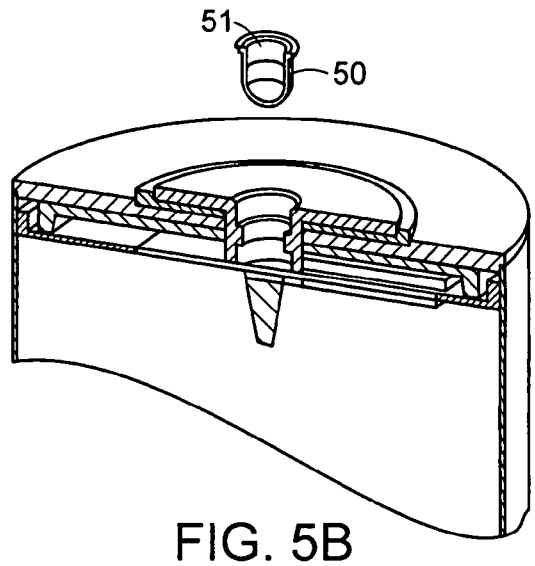
FIG. 5A
FIG. 5B
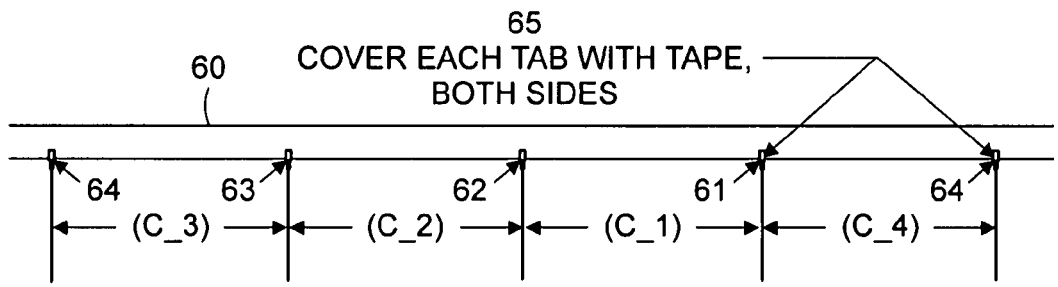
FIG. 6A
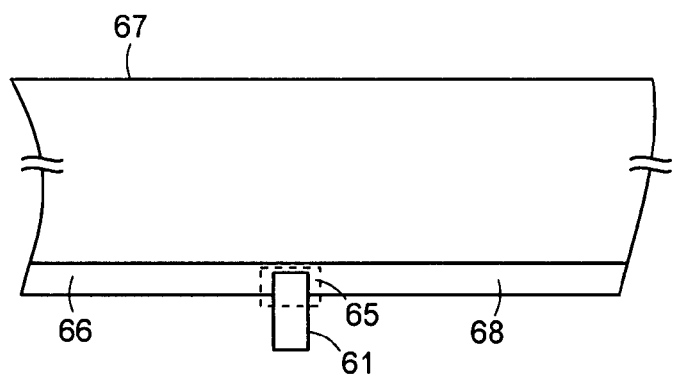
FIG. 6B

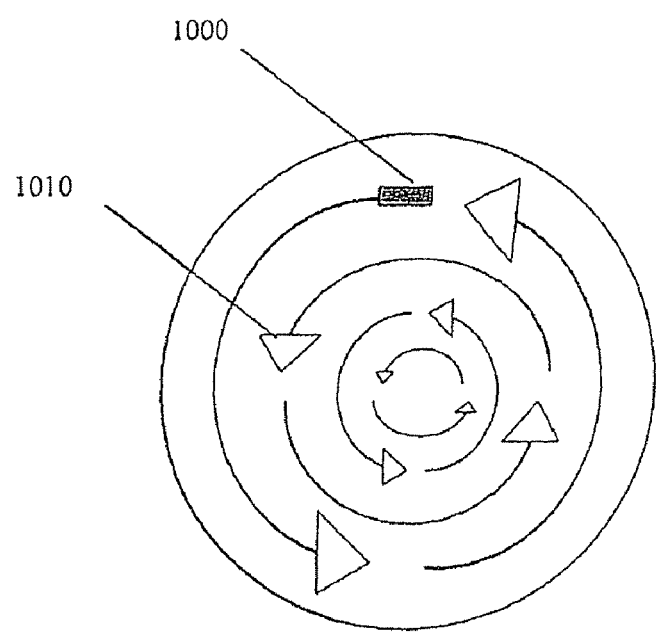 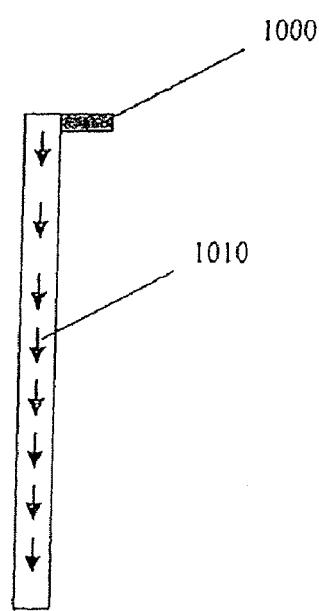
Figure 10A
PRIOR ART
Figure 10B
PRIOR ART

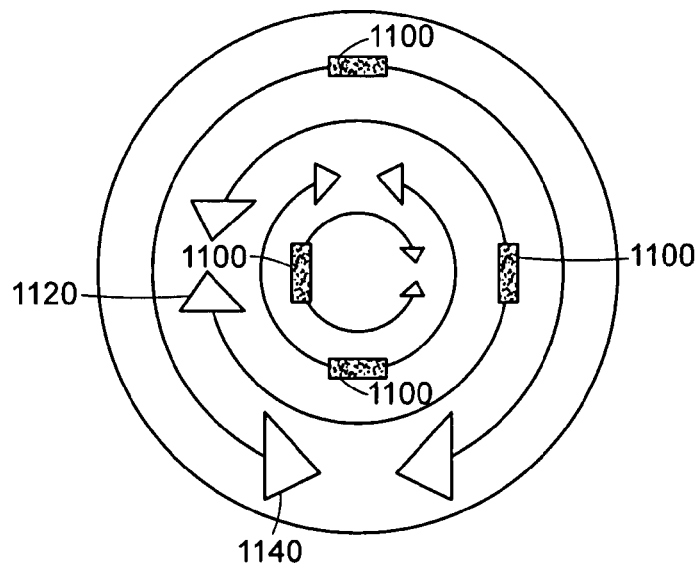
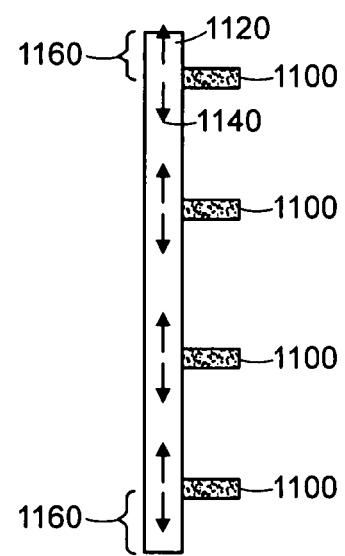
FIG. 11A
FIG. 11B

BATTERY TAB LOCATION DESIGN AND METHOD OF CONSTRUCTION

RELATED APPLICATION

This is application is a continuation-in-part of and claims priority under 35 U.S.C. §120 to U.S. patent application Ser. No. 11/515,597, now U.S. Pat. No. 7,927,732 filed Sep. 5, 2006, and which claims the benefit of priority under 35 U.S.C. §119(e), to U.S. Application No. 60/714,171, filed Sep. 2, 2005, both of which are entitled "Battery Cell Design and Method of Its Construction," which are hereby incorporated by reference in their entirety.

This application also claims the benefit under 35 U.S.C. §119(e) of U.S. Provisional Patent Application No. 60/799, 873, filed May 12, 2006, entitled "Low-Inductance Cylindrical Battery," which is hereby incorporated by reference in its entirety.

FIELD OF THE INVENTION

The present invention generally relates to an electrochemical battery cell. More particularly, the present invention relates to a compact, robust, multifunctional and highly manufacturable rechargeable battery cell.

BACKGROUND

Increasing the discharge capacity of electrochemical cells is an ongoing objective of manufacturers of electrochemical cells and batteries. Often there are certain maximum external dimensions that place constraints on the volume of a given type of cell or battery. These maximum dimensions may be imposed through industry standards or by the amount of space available in the device into which the cells or batteries can be put. Only a portion of the volume is available for the materials necessary for the electrochemical discharge reactions (electrochemically active materials and electrolyte), because other essential, but inert, components (e.g., containers, seals, terminals, current collectors, and separators) also take up volume. A certain amount of void volume may also be necessary inside the cells to accommodate reaction products and increases in material volumes due to other factors, such as Increasing temperature. To maximize discharge capacity in a cell or battery with a limited or set volume, it is desirable to minimize the volumes of inert components and void volumes.

Conventional battery cell designs incorporate a single open ended prismatic or cylindrical cell can and one matching cell end cap, used to hermetically seal the cell's internal components from the outside world. The construction and design of the cell's end cap and the manner in which it mounts to the cell's can directly effect how the cell is "activated," or internally saturated with electrolyte, how the cell vents gas during an unsafe high pressure event, and how the cell's internal active materials are connected to its external power terminals.

A cylindrical cell is typically activated by first saturating the cell's internal components with electrolyte and then assembling the end cap to the can. Attempts to create a robust hermetic seal between the cell's can and the cell's end cap after the cell has been activated are complicated by the presence of electrolyte. This becomes especially true when using a welding process at this seam. Conventional cylindrical battery cell design avoids this problem by using non-welding techniques, such as crimping, to seal the end cap to the can after electrolyte fill. These crimping techniques are not an efficient use of cell volume and reduce the total energy capacity of a cell.

Conventional prismatic cell designs create a hermetic and volumetrically efficient weld joint between the end cap and can before activating the cell. Activation in a prismatic cell is typically achieved by saturating the internal components with electrolyte introduced through a small opening in the sealed end cap, called a fill hole. After activation is complete, this fill hole is then hermetically sealed by various means. In welded cell designs, the task of hermetically sealing the fill hole is challenging. This seal is typically achieved by the addition of parts as well as some sort of curing adhesive or an additional weld, resulting in a protrusion over the fill hole that has to be managed during cell usage. Additionally, this fill hole is typically placed off center to give central placement priority to the power terminal. In volumetrically efficient cell designs, the wall thickness where this fill hole exists is often very thin, making sealing even more challenging. The result is a highly uncontrollable, unreliable, and in-the-way fill-hole seal.

Electrochemical cells are capable of generating gas, during storage, during normal operation, and, especially, under common abusive conditions, such as forced deep discharging and, for primary cells, charging. Cells are designed to release internal pressure in a controlled manner. A common approach is to provide a pressure relief mechanism, or vent, which releases gases from the cell when the internal pressure exceeds a predetermined level. Pressure relief vents often take up additional internal volume because clearance is generally needed between the vent and other cell or battery components in order to insure proper mechanical operation of the mechanism.

A cylindrical cell is vented using a complex valve designed to initially cut off current flow when a certain internal pressure is reached and then ultimately open when the cell experiences a higher internal pressure threshold. When the valve actuates, the cell is usually considered unusable. Vent mechanisms in cylindrical cells tend to be "hidden" under the battery terminal so that they take up less space on the end cap. In addition to using up valuable cell volume that could otherwise be used for cell capacity, this results in a series of small vent "windows" in the end cap that are designed to allow gas to escape from during a high pressure event. Often, when a cell experiences this type of event, materials other than gas try to escape from the cell through this vent and end up clogging these windows. This defeats the purpose of the vent, preventing gas from escaping, and the cell ends up reaching critical internal pressures and often explodes.

Venting in a prismatic cell occurs for the same reasons as in a cylindrical cell, but is usually less of mechanism and more of an area of increased mechanical stress concentration. Typical vent designs in prismatic cells are engineered holes that burst at specific pressures. Vents, if even present in prismatic cells, are typically very small by design in order to share end cap space with the fill hole and the battery terminal. These small vents can result in similar clogs and ultimately the same explosions.

Another component of electrochemical cells are current collectors. Small electrically conductive current collectors, or tabs, typically make the connections between a cell's internal active material and its external power terminals. Due to chemical compatibility and corrosion problems, these tabs are limited to a few metal types, depending on whether the tabs are on the anode (−) or cathode (+) potential of the cell. Most cylindrical cells make their cans out of a steel alloy, which forces the can to be at anode (−) potential. This allows the active internal anode material to be connected directly to the can by a simple single current collector (tab) welded to the can. In typical cylindrical cell design, the active internal cathode material is then connected to the power terminal on the end cap. Typically, the end cap is a complex and composite design made from both aluminum and steel.

Typical battery cell features contained within a conventional prismatic battery end cap include a fill-hole that allows for the cell's activation during the manufacturing process; a valve that allows the cell to vent gas during an internally unsafe high-pressure event; and a power terminal that allows the cell to transfer power to the outside world.

Improvements to address these and other limitations of conventional cylindrical and prismatic batteries are desired.

SUMMARY OF THE INVENTION

A low inductance, easily manufacturable electrochemical cell is provided. In one or more embodiments, a cylindrical electrochemical cell can include a spirally wound assembly having an anode sheet and a cathode sheet separated by separator membranes, the cathode sheet having a first electroactive layer on a first current collector, and the anode sheet having a second electroactive layer on a second current collector, the spirally wound assembly having a cylindrical side wall and opposing end faces. At least one of the first current collector and the second current collector can be in electrical communication with conducting tabs that extend from the anode sheet or the cathode sheet, the conducting tabs extend from an end face of the spirally wound assembly. Centers of the conducting tabs can be located within a 90 degree quadrant of an end face of the spirally wound assembly.

In one or more embodiments, the first current collector can be in electrical communication with a first plurality of conducting tabs that extend from the cathode sheet, and the second current collector can be in electrical communication with a second plurality of conducting tabs that extend from the anode sheet, and the first plurality of conducting tabs and the second plurality of conducting tabs can extend from opposing end faces of the spirally wound assembly.

In one or more embodiments, the conducting tabs can be uniformly spaced along a length of the anode sheet or the cathode sheet. In one embodiment, the conducting tabs are located beyond a distance from leading edges of the anode sheet or the cathode sheet.

In one or more embodiments, the conducting tabs include 4 to 12 tabs. In one embodiment, the conducting tabs are uniformly spaced along a length of the anode sheet or the cathode sheet.

In one or more embodiments, the first current collector can be in electrical communication with a first plurality of 4 to 12 conducting tabs that extend from the cathode sheet, and the second current collector can be in electrical communication with a second plurality of 4 to 12 conducting tabs that extend from the anode sheet.

In one or more embodiments, locations of the conducting tabs can be selected such that net magnetic fields caused by induced currents in the electrochemical cell is reduce by at least 80% compared to having only a single conducting tab located at a leading edge of the anode sheet or the cathode sheet.

In one or more embodiments, the conducting tabs intersect when folded towards the center of the end face.

In one or more embodiments, the conducting tabs are of different lengths. In one embodiment, the lengths of the tabs are selected so that the ends of the tabs are aligned when folded.

In one or more embodiments, the cylindrical electrochemical cell has 1 tab per 50 cm$^2$ to 400 cm$^2$ area of anode and cathode sheet.

In one or more embodiments, the conducting tabs are secured to a connecting strap. In one embodiment, the connecting strap is electrically connected to a terminal of a case housing the spirally wound electrochemical assembly.

In one or more embodiments, a cylindrical electrochemical cell can include a spirally wound assembly having an anode sheet and a cathode sheet separated by separator membranes, the cathode sheet having a first electroactive layer on a first current collector, and the anode sheet having a second electroactive layer on a second current collector, the spirally wound assembly having a cylindrical side wall and opposing end faces. At least one of the first current collector and the second current collector can be in electrical communication with 4 to 12 conducting tabs that extend from the anode sheet or the cathode sheet, the conducting tabs extend from an end face of the spirally wound assembly.

In one or more embodiments, the first current collector can be in electrical communication with a first plurality of 4 to 12 conducting tabs that extend from the cathode sheet, and the second current collector can be in electrical communication with a second plurality of 4 to 12 conducting tabs that extend from the anode sheet, and the first plurality of conducting tabs and the second plurality of conducting tabs can extend from opposing end faces of the spirally wound assembly.

In one or more embodiments, the conducting tabs can be uniformly spaced along a length of the anode sheet or the cathode sheet. In one embodiment, the conducting tabs are located beyond a distance from leading edges of the anode sheet or the cathode sheet.

In one or more embodiments, the conducting tabs can be located within a 90 degree quadrant of an end face of the spirally wound assembly.

In one or more embodiments, locations of the conducting tabs can be selected such that net magnetic fields caused by induced currents in the electrochemical cell is reduce by at least 80% compared to having only a single conducting tab located at a leading edge of the anode sheet or the cathode sheet.

In one or more embodiments, the conducting tabs intersect when folded towards the center of the end face.

In one or more embodiments, the conducting tabs are of different lengths. In one embodiment, the lengths of the tabs are selected so that the ends of the tabs are aligned when folded.

In one or more embodiments, the cylindrical electrochemical cell has 1 tab per 50 cm$^2$ to 400 cm$^2$ area of anode and cathode sheet.

In one or more embodiments, the conducting tabs are secured to a connecting strap. In one embodiment, the connecting strap is electrically connected to a terminal of a case housing the spirally wound electrochemical assembly.

In one or more embodiments, a method of providing electric current include: interposing a separator membrane between a positive electrode having a first electroactive layer on a first current collector and a negative electrode having a second electroactive layer on a second current collector to form a multilayer assembly, wherein each of the current collectors has conductive tabs in electrical contact with and extending outward from the current collectors. The tabs of the positive electrode and the tabs of the negative electrode are on opposite sides of the multilayer assembly. The method can further include spirally winding the multilayer assembly such that the tabs of a selected current collector are aligned within a 90 degree quadrant of an end face of the spirally wound assembly; folding the tabs of the selected current collector towards the center of the spiral wound assembly such that the tabs intersect one another; collecting the overlapped tabs of the selected current collector at a point beyond the tab intersection; and securing the collected tabs of the selected current collector to a connecting strap.

In one or more embodiments, tab lengths are select such that the collected tabs are aligned at their terminal edges.

In one or more embodiments, the tabs of the selected current collector are uniformly spaced along a length of the selected current collector.

In one or more embodiments, a cylindrical electrochemical cell can include a spirally wound assembly having an anode sheet and a cathode sheet separated by separator membranes, the cathode sheet having a first electroactive layer on a first current collector, and the anode sheet having a second electroactive layer on a second current collector, the spirally wound assembly having a cylindrical side wall and opposing end faces. At least one of the first current collector and the second current collector can be in electrical communication with conducting tabs that extend from the anode sheet or the cathode sheet, the conducting tabs extend from an end face of the spirally wound assembly. The conducting tabs are located along a length of the at least one of the anode sheet and the cathode sheet such that net magnetic fields caused by induced currents in the cylindrical electrochemical cell is about zero.

BRIEF DESCRIPTION OF THE DRAWING

The invention is described with reference to the following figures, which are provided for the purpose of illustration only, the full scope of the invention being set forth in the claims that follow.

FIG. 1 is an exploded diagram illustrating the internal components of a battery cell design according to one or more embodiments of the invention.

FIG. 2 is a cross-sectional illustration of an assembled battery cell according to one or more embodiments of the invention.

FIG. 3 is a view of a positive (cathode) end cap showing a pressure release vent and an interface terminal.

FIG. 5A depicts a perspective view the sealing of the fill hole in the negative end cap with a metal plug and a plastic seal after cell activation.

FIG. 5B depicts a cross-sectional enlarged view of the sealing of the fill hole in the negative end cap with a metal plug and a plastic seal after cell activation.

FIG. 6A is a plan view of an electrode sheet with tabs.

FIG. 6B is an enlarged plan view of an electrode sheet with tabs.

FIG. 10A illustrates the tab position and current flow in a conventional cylindrically wound battery, as viewed from the rolled end face of the spirally wound electrode.

FIG. 10B is a plan view of an unrolled electrode of the conventional cylindrically wound battery shown in FIG. 10A.

FIG. 11A illustrates the tab position and current flow in a cylindrically wound battery according to one or more embodiments of the invention, as viewed from the rolled end face of the spirally wound electrode.

FIG. 11B is a plan view of an unrolled electrode of the cylindrically wound battery shown in FIG. 11A.

DETAILED DESCRIPTION

Figure 4A:
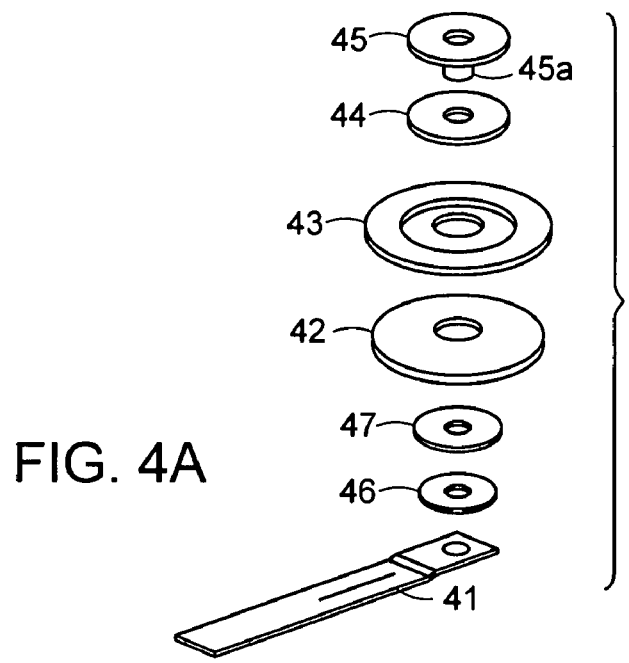
FIG. 4A provides an exploded view of the components used in a negative (anode) end cap assembly.

Conventional battery cell end cap design incorporates one or more of a fill-hole, a safety vent, and a power terminal into the design of an end cap. These features are usually separate, individual, and bulky entities occupying their own internal volume on the cell's end cap. Battery cells that utilize a symmetrically centralized activation fill-hole have a distinct advantage during manufacture over cells whose activation fill holes are off center and require orientation during fill. Battery cells that utilize a symmetrically centralized battery terminal have a distinct advantage in commercial applications over cells whose power terminal is off center and require specific orientation during use and/or packaging into larger format strings of cells.

In one or more embodiments of the present invention, a cylindrical cell is provided that includes upper and lower welded end caps. The cell's primary packaging (can and end caps) is composed of aluminum alloy. The weld seal is typically obtained by laser welding, or optionally by other metal joining methods such as ultrasonic welding, resistance welding, MIG welding, TIG welding. The end caps of the doubly (upper and lower ends) welded container may be thicker than the can wall; e.g., the end caps may be up to about 50% thicker than the can wall. This differential in thickness is not accomplished by other means, such as deep drawing. The doubly welded cell packaging can provide significantly greater cell volume than crimped seals or singly welded cells. In addition, the thick end caps improve mechanical robustness of the cell, for example, against crushing. The additional cell modifications incorporated into the cell design permit the use of a doubly welded packaging, which is not otherwise possible or convenient with conventional battery cell designs.

In one or more embodiments, the battery cell package design uses a low weight and highly compact aluminum housing, and is typically an aluminum alloy such as Al3003H14. Aluminum and aluminum alloys provide high specific modulus and high specific stiffness in the structure and a high strength to weight ratio. Aluminum is also one of the few materials that are stable at the cathode potential of a Li-ion cell. Several features of the battery design are shown in the exploded diagram of FIG. 1. The cell design includes a positive end cap (1), a cathode extension tab (2), an insulation disc (3), a cylindrical tube (4), a negative end cap (5), anode current collection tabs (6), cathode current collection tabs (7), and internal active cathode and anode materials (electrodes) (8). The positive end cap (1) contains both the positive battery terminal for the cell as well as the cell's vent mechanism. The cathode extension tab (2) acts as an electrical connection between the cathode current collection tabs (7) and the cell's external positive terminal (1). The insulation disk (3) includes slots (3a) through which the current collection tabs extend. The insulation disc (3) prevents the cathode current collection tabs (7) and the cathode extension tab (2) from shorting to the internal active cathode and anode materials (8). The cylindrical tube (4) acts as the main housing for the cell package.

During assembly, weld and crimp joints are used to connect both sets of current collector tabs (6) and (7) to both end caps (5) and (1), respectively, via the extension tab (2) and the integrated extension tab (5a) found in the negative end cap (5). Both end caps are welded to tube (4) to make the cylindrical cell. The negative end cap (5) contains both the cell's negative battery terminal as well as the cell's fill hole (discussed in greater detail below), both of which share the same internal volume and external space and are symmetrically centered in the cell. Negative end cap (5) also has an integrated extension tab (5a) for making an electrical connection between the anode current collection tabs (6) and the cell's external negative terminal located on the negative end cap (5). An insulation disk (3) with slots (3a) is also used at the anode to prevent shorting of the anode current collection tabs (6) and anode extension tab (5a).

An assembled cell incorporating the design features of FIG. 1 is shown in FIG. 2 in cross-section, where like elements are similarly labeled. Once assembled, the cell incorporates favorable features for both manufacturing and customer interface in a volumetrically efficient package. This allows for the vast majority of the inside of the cell to be used for active material, greatly improving the cell's energy storage capacity to volume ratio.

Individual components and features of the cell are described.

The positive end cap (1) includes an engineered vent score (10) and a nickel interface terminal (9), as illustrated in FIG. 3. The engineered vent score opens under a predetermined internal pressure, lefting large amounts of gas and material exit the cell if necessary. The vent is an annular groove located near the periphery of the positive end cap, disposed between the end cap circumference and the nickel terminal. The groove can be located on the inner or outer face of the end cap, or both. In one or more embodiments, the groove is located on both the inner and outer faces of the end cap. The grooves may oppose one another or be offset from one another. The groove provides a thinned radial section in the end cap that is designed to rupture at a preselected pressure. The annular groove forms an arc on the end cap that is in the range of about 150 degrees to a full 360 degrees, or about 180 degrees to about 300 degrees. The actual arc length will depend on the size of the cell. The arc length can be selected so that the end cap hinges when ruptured and the ruptured end cap is not severed from the battery can, but also can be up to about a full 360 degree arch with no apparent hinge. A further advantage of the annular groove is that it serves to thermally insulate the terminal during welding of the end cap to the battery body. The groove is introduced by conventional methods, such as stamping, scoring or scribing and the like.

The nickel interface terminal (9) provides a low resistance, corrosion resistant battery terminal, as well as a weldable interface for connecting batteries together in packs. The nickel plate can range in thickness and typically has a thickness in the range of about 75 μm to about 125 μm. Thicker terminal plates are particularly well-suited for high power batteries. In one or more embodiments, the body of the cathode cap is aluminum and, for example, is the same aluminum alloy as the battery tube. In one or more embodiments, the cathode cap may be is plated with a layer of nickel on its outside surface. The nickel interface terminal is then either resistance (spot) welded to the cathode cap to give a mechanically robust interface, re-flow soldered to the nickel plating layer to give an electrically robust interface between the two parts, or both. Other welding and soldering techniques may be used, for example, ultrasonic welding or electrically conductive adhesives. Suitable solder includes solder having a melting temperature above the maximum use temperature of the battery. This joining technique between the Ni terminal and the Al cathode cap is unique in the battery industry.

The pressure vent occupies a peripheral region of the end cap face and does not interfere with the location and securing of the nickel terminal. The nickel terminal cross-sectional area can be quite large and can occupy a significant portion of the end cap face. This serves to reduce cell impedance and to provide cell to cell weld-ability during pack assembly.

Figure 4B:
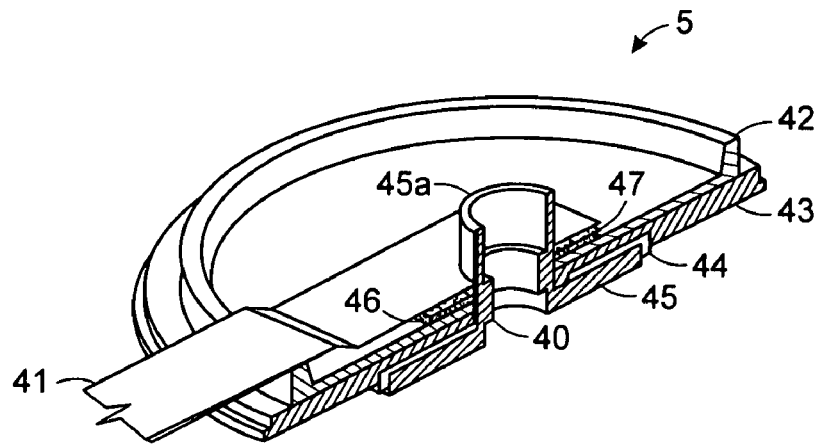
FIG. 4B shows a cross-sectional view of an assembled negative end cap.
Figure 4C:
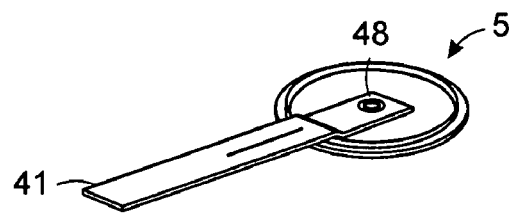
FIG. 4C shows a perspective view of an assembled negative end cap after riveting.

FIGS. 4A-4C depict a negative end cap (5) including a centrally located fill hole (40). The fill hole is used to activate the cell once assembled and is defined, at least in part, by a hollow bore rivet (45) which makes up the power terminal. Dual use of the central location of the negative end cap as both a fill hole and as a power terminal provides efficient use of space and does not interfere with battery operation. The fill hole (40) is centrally located in the end cap face. The centrally located fill hole provides a feed through inlet fittingly disposed within the hole and connecting to the interior of the cell. Electrolyte is introduced through this feed through inlet during activation.

The negative end cap is constructed by assembling the constituent components as illustrated in the exploded diagram of FIG. 4A. Upper gasket (44) is placed into end cap body (43), which may contain a depression for receiving the gasket. The hollow bore rivet serving as the power terminal (45) is assembled into upper gasket (44). The stem (45a) of rivet (45) extends through a central opening of both the upper gasket (44) and end cap body (43). The assembly is flipped over, and seal gasket (47) is inserted onto gasket (44) and placed onto body (43). Lower gasket (42), seal gasket (47), and rivet backing disc (46) are assembled and positioned as illustrated in FIG. 4A. Extension tab (41) is inserted onto the stem of rivet (45). The as-assembled components, prior to crimping are shown in FIG. 4B.

Rivet (45) may be Ni plated steel for both good corrosion resistance and good weldability, which serves as the power terminal for the cell. The flat head of rivet (45) extends over a portion of the external face of the end cap and the hollow stem (45a) extends into the interior of the cell. It also includes a fill hole through its center with an engineered ledge to help sealing, a symmetric shape, and a centralized rivet stem for sharing space and symmetry between the battery terminal and the fill hole. Extension tab (41) connects the power terminal (45) with the cell's internal active anode material. A lower gasket (42) protects the extension tab (41) from contacting the end cap body (43), which is at a different voltage potential. Body (43) is hermetically sealed to the battery tube (not shown) or the main body of the cell through any number of methods, including but not limited to the aforementioned methods of crimping and welding. Upper gasket (44) insulates the power terminal (45) from the end cap body (43), which are at different voltage potentials. Rivet backing disc (46) helps to create a robust press-rivet clamp force onto body (43). Seal gasket (47) helps to achieve a robust seal underneath the press-rivet.

The entire assembly may be crimped together by pressing and deforming the stem of rivet (45), as illustrated in FIG. 4C, squeezing all of the parts together to form press-rivet (48) and creating a good electrical contact between the extension tab (41) and the power terminal (45).

After the end caps have been welded to the cell's tube, the cell is activated by filling electrolyte through the hole in the power terminal (45). Turning now to FIGS. 5A and 5B, fill hole (40) is hermetically sealed by means of fill hole plug seal

(50) (e.g., a high temp plastic seal) and fill hole plug (51), a deformable insert; e.g., a deformable metal insert. Fill hole plug seal (50) is pressed into the fill hole opening after the end cap has been sealed to the tube and the cell has been activated with electrolyte. The fill hole plug (51) is then pressed into this same fill hole, expanding, clamping and holding the seal (50) up against the engineered ledge of the rivet (45) and achieving a hermitic seal where the fill hole used to be.

The internally active material of the cell includes two electrodes, a cathode and an anode. One contributor to the impedance of a battery cell is the lack of current carrying paths between the active cell materials (anode and cathode) and the external cell terminals. It has been surprisingly discovered that overall cell impedance can be significantly lowered by using more current carriers, or "tabs", than conventional cylindrical (wound assembly) cells, whose designs call for one or two tabs per electrode. In one or more embodiments of the invention, a plurality of tabs are joined at a larger current collector on either side of the cell called an extension tab, which then makes the connection with each of the battery terminals of the cell. In one or more embodiments, the electrode can include about 4 to about 12 tabs, and for example, may include four tabs. In other embodiments, the electrode includes one tab per 200 $cm^2$ area of electrode. High power battery cells will require a higher density of tabs than low power cells.

In one or more embodiments of the invention, each of the electrodes in this cell design uses several, e.g., four to twelve, current collecting tabs to conduct current out of each of the active material, e.g., cathode and anode, and into the battery terminals. FIG. 6A depicts an exemplary electrode sheet (60). The electrode sheet (60) includes an integral current collector substrate (66) and a layer of electroactive material (67) in electrical connection to the current collector substrate. Current collecting tabs (61), (62), (63), (64) extend from an edge portion (68) of the electrode.

The tabbed electrodes are then organized into an electrochemical cell. A separator sheet, e.g., two separator sheets, is interposed between the cathode and anode sheets such that the tabs of the cathode and anode are located at opposite sides of the assembly. The multilayer assembly is spirally wound to form a spiral electrochemical assembly, known as a "jellyroll." A jellyroll (8) with extended tabs (6), (7) is illustrated in FIG. 1.

The tabs can be of different length, which reflect their distances from the jelly role center when wound. The length of the tabs may be adjusted before or after winding the jellyroll. In order to form the tabbed electrode, a portion of the electroactive material is removed from an edge of the electrode to create a clean surface for electrical contact as shown in FIG. 6B (not drawn to scale). The tabs are electrically connected, e.g., by welding, riveting, crimping or other similar technique, to an exposed portion of the electrode. An exemplary method for cleaning the contact surfaces and attaching the collector tabs is provided in co-pending U.S. Provisional Patent Application No. 60/799,894 entitled "Use of a Heated Base to Accelerate Removal of Coated Electrode in the Presence of a Solvent," filed on May 12, 2006, the contents of which are incorporated by reference. The tabs are then covered with a non-reactive tape (65), which covers the exposed metal tabs and prevents undesired chemical reactions with the cell chemicals. Tape (65) covers both sides of the electrode in the vicinity of the tabs. The tape covers that portion of the tab that lies over the electrode and may cover some or all of the underlying electrode that remains exposed, i.e., that is not covered by either active electrode layer or a current collecting tab. At least a portion of the tab that extends out from the electrode is not covered by tape.

Figure 7A:
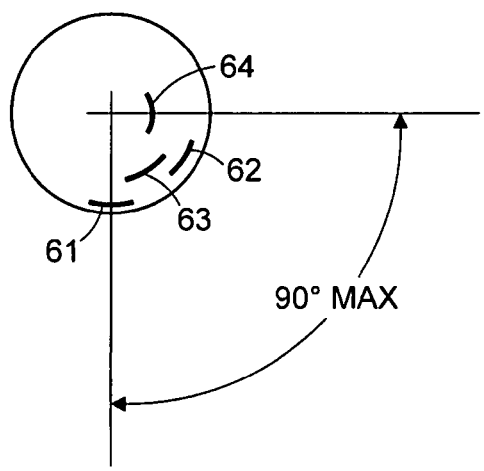
FIG. 7A shows a top view of a battery can indicating the exemplary location of collector tabs within a 90 degree quadrant.
Figure 7B:
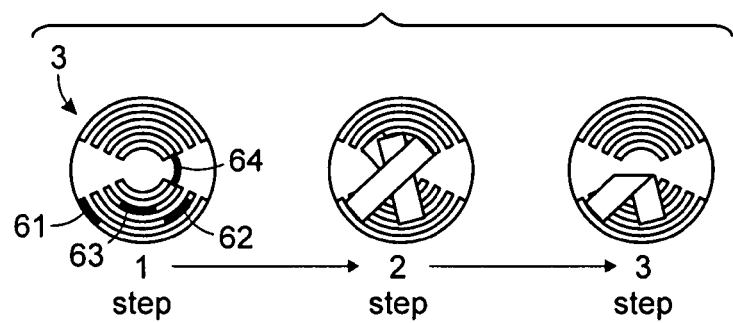
FIG. 7B depicts a series of views of the cell design according to one or more embodiments of the invention, and illustrates the location and bending of current collecting tabs.

In order to maximize the reduction in impedance of a cell through the addition of tabs, these four tabs can be positioned at equal intervals along each of the two electrode's lengths, e.g., as close to $\frac{1}{8}$th, $\frac{3}{8}$th, $\frac{5}{8}$th, and $\frac{7}{8}$th of the electrode length as possible, to thereby minimize the distance that current must travel through the electrode in order to reach the current collector tabs and the battery terminals. By minimizing the distance traveled within the electrode, internal resistance is minimized. Significant reductions in resistance are observed as the number of tabs is increased from one, in conventional batteries, to four or more, e.g., up to about 12, in accordance with one or more embodiments. As the number of tabs is increased beyond this, diminishing improvements in reducing resistance is observed. Other arrangements using more or less than 4 tabs are also contemplated. Once wound together, the jellyroll has the respective four (or other numbers) tabs sticking out of either end, as is illustrated in FIG. 1. These tabs are gathered together and connected to an external terminal, as illustrated in FIGS. 7A and 7B. According to one or more embodiments of the present invention, a cell tabbing design is provided to control and capture all of the tabs in a volumetrically efficient, manufacturable, and mechanically robust manner.

In one aspect of the tab design, the thickness of the materials that make up the jellyroll is controlled. Each of the materials (anode electrode, cathode electrode, and separator) have thickness controlled to a very tight tolerance (approximately +/−2 um each). This allows one to model and reliably predict exactly how these materials will spirally wind into a jellyroll, including the number of turns and the finished diameter. This permits the accurate location of the tabs within the jellyroll.

In another aspect of tab design, the tab positions on the electrodes are selected before they are wound into the jellyroll. The tabs are placed along the length of each of the electrodes in positions that are both close to the $\frac{1}{8}$th, $\frac{3}{8}$th, $\frac{5}{8}$th, and $\frac{7}{8}$th electrically optimized connections, e.g., for a 4-tab design, as well as positions that are predicted to align after the electrodes have been wound into the jellyroll. Tab positions are selected such that, for example, the four tabs of a single electrode are aligned with each other within a preselected region of the top face of the jellyroll. For example, the four tabs are position on a cathode sheet so that, on assembly into a jelly roll, the 4 tabs of the cathode sheet project from the face of the jelly roll in a selected region of the roll face. In one or more embodiments, the tabs are aligned within a 90 degree quadrant or larger, for example 150 degrees, as defined on the rolled end face of the spirally wound electrode assembly. The region, e.g., a 90 degree quadrant, is measured from the centerline of each tab, to account for the tab widths. In some embodiments, the tabs are located in an approximately 140 degree arc window. This alignment aids in the control and capture of each set of four (or more) tabs. Exemplary alignment of the tabs within a 90 degree quadrant is shown in FIG. 7A. By aligning the tabs within a selected region (e.g., a 90 degree quadrant), the costs for manufacturing the jellyroll cell can be reduced.

A third aspect of tab design is selection of the appropriate tab length and tab bending, as is illustrated in FIG. 7B. This is how the four tabs (61), (62), (63), (64) are captured and connected to the battery terminals. Step 1 of FIG. 7B shows the rolled top face of a battery and the location of all four tabs as they project from the face of the jellyroll. An insulation disc (3) is positioned over the end of the jellyroll, and the tabs are inserted through slots in the insulation disc. The insulation disc isolates each tab from the jellyroll. First all four tabs are bent towards the center axis (indicated by an "+" in FIG. 7B) of the jellyroll over an insulation disc (3). The result is a stack of tabs fanning in a region of up to about 140 degrees over of the face of the jellyroll. As noted previously, the tab length may vary. In one or more embodiments, the tab closest to the center axis, e.g., tab (64), is the shortest and the tab farthest from the center axis, e.g., tab (61), is the longest. The tab closest to the center of the jellyroll may be cut to a shorter length than the rest of the tabs, and each subsequent outwardly positioned tab is longer than the previous inner tab. The result is that when all four tabs are folded over, as illustrated in step 2 of FIG. 7, their ends align the same distance away from the axis of the jellyroll. Once the tabs are all laying flat, they are in the position that they will be in when the cell is finished. However, they must first be connected to the battery terminal's extension tab. In order to achieve this they are all bent together at about a 90° angle to the face of the jelly roll and parallel to and at the axis of the jellyroll, as illustrated in step 3 of FIG. 7. This consolidates the four tabs into one entity to which the battery terminal's extension tab can easily be welded.

Figure 8:
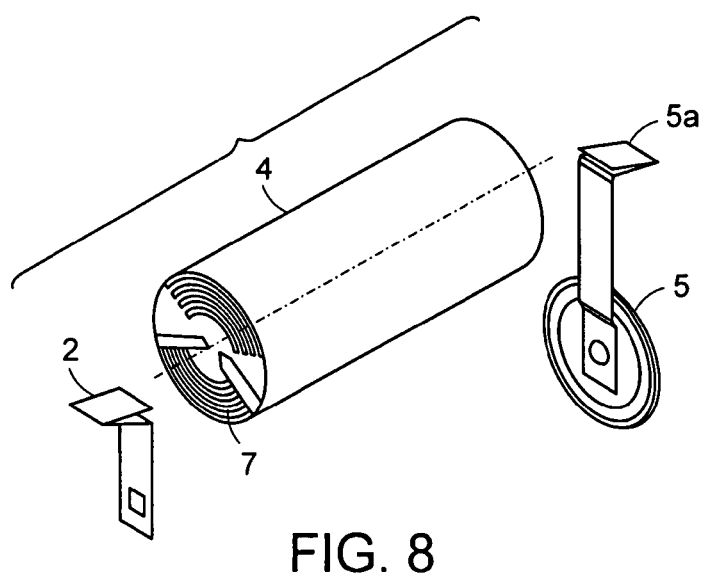
FIG. 8 depicts the attachment of current extension tabs to the respective terminals.

The fourth aspect of tab design is the joining of the battery extension tabs to the four electrode tabs. In one design this is achieved through ultrasonic welding, but resistance welding or other metal joining technique could be adopted just as easily. In one embodiment, the extension tabs are first folded in a way that allows a welder to pinch them over the four electrode tabs, however, other means of joining the components are contemplated. The thicker extension tab protects the thinner electrode tabs from being damaged by the welder. The joining is achieved in a manner that allows the four electrode tabs as well as the extension tabs to be both folded back down flat, achieving a very volumetrically efficient cell design. Once the tabs have been welded and folded flat, the cell's end caps are welded to the tube, resulting in very little space used for managing tabs that could otherwise be used for additional cell energy capacity. This is illustrated in FIG. 8.

A fifth aspect of tab design is the location of the tabs along the spiral assembly to reduce the induced magnetic field in pulsed power applications. It has been discovered that inductance internal to a battery used in a system which interrupts the current flow from the battery many times a second, e.g., pulsed applications, can increase power losses in the system, thereby resulting in higher internal device heating and decreased battery runtimes. The battery consists of conductors, e.g., electrode sheets, that carry current between the internal energy storage medium and the external loads. The inductance of a battery can be a result of the dimensions, shape and/or number of the conductors through which the current in the battery flow. Their geometry influences the electromagnetic fields around the conductors caused by changing current flow. The larger the electromagnetic energy induced around the conductors, the higher the inductance that can be measured through the conductors. Conversely, the more inductance that a conductor exhibits, the more electromagnetic energy is stored around them as it passes currents to and from the battery to a load such as a motor.

Figure 9:
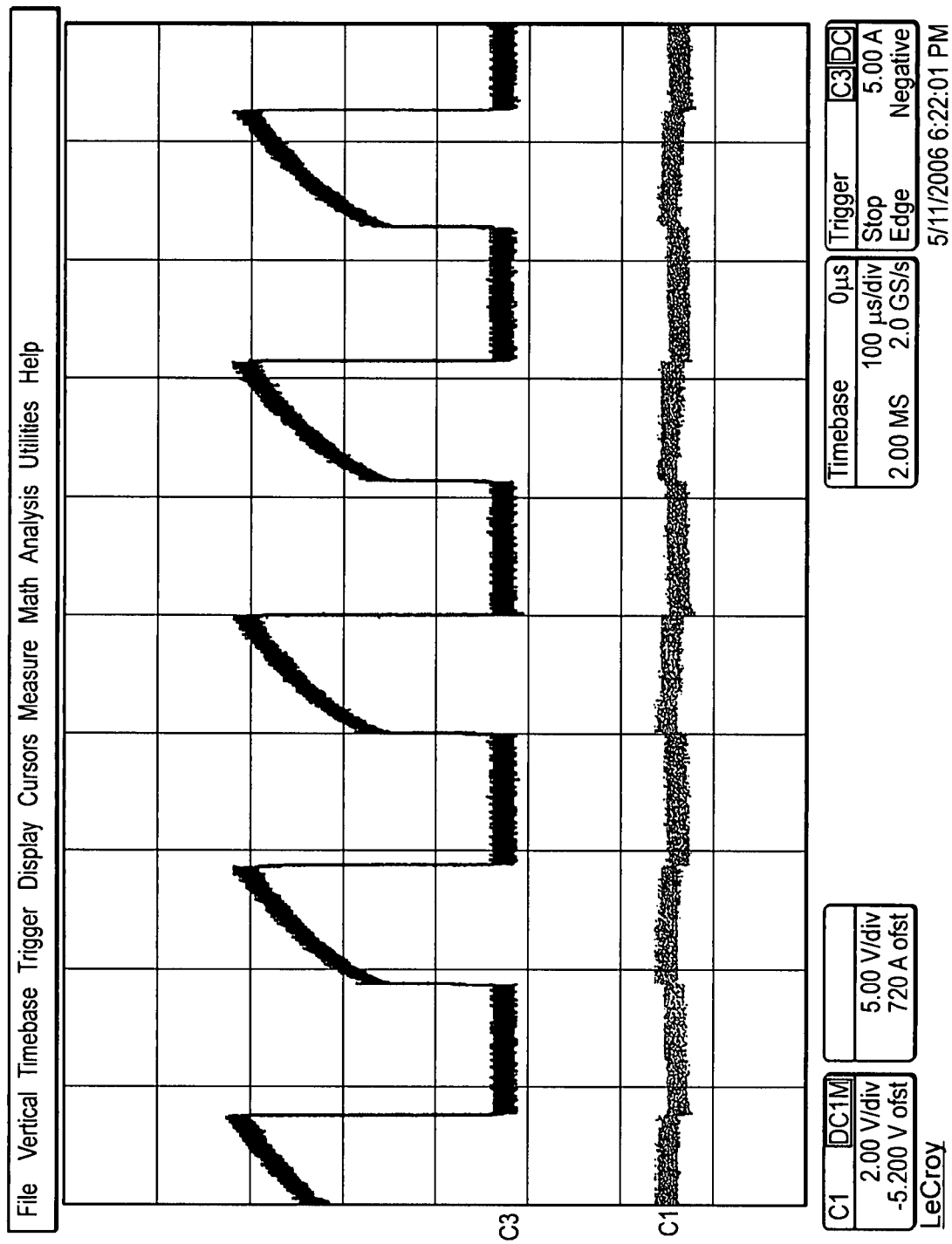
FIG. 9 is a plot of current vs. time in a motor that is pulsed about 4000 times/sec.

In an application such as variable speed drill or other tool, the motor is pulsed many times a second. This means that current is switched into the motor, by use of an electronic switch, and then switched off. FIG. 9 shows how the current is pulsed into an example motor (e.g., a power tool) about four thousand times a second. The trace representing the current, goes up, then rapidly goes back down. The motor controller in the power tool can switch on and off the current several thousand times a second. The magnetic field around the conductors that carry the current to the motor exists only during the time that the current flows, It goes to zero when the current is zero. The problem is that this magnetic energy can be transformed to other types of energy such as heat.

When the motor controller attempts to turn off the current from the battery, the magnetic field around the conductors cause the current to continue to flow, even though the controller's switch is opened. This current is typically absorbed in a dissipative element, such as a resistor, and dissipated as heat. A circuit designed to absorb this stray magnetic field energy is often called a snubber, and is commonly found in power circuits that rapidly interrupt current flow from energy sources. The higher the inductance of the power circuit including that of the energy source, the more energy needs to be dissipated by the snubber. This dissipated energy can be evidenced by heat built up in the motor speed controller circuitry. If no snubber were designed into the circuitry, the energy would be dissipated elsewhere, such as in the other power switching circuit elements. In any case the energy will be dissipated and turned to heat inside the load system's switching controller. Another factor that determines how much energy is dissipated in the controller is how many times the current is interrupted by it. The more times this stored magnetic energy is transferred from magnetic energy to heat energy, the higher the temperatures will be seen inside the motor controller circuitry.

Therefore, batteries with lower inductance will result in less heat dissipated by a switching controller, which pulses current from the battery to a motor or other load. Such applications include, but are not limited to variable speed power tools, shavers, remote controlled model vehicles, electric propulsion systems for human and material transport, uninterruptible power systems, and any other device employing switching power supply devices to control the flow of current from an energy source, namely a battery.

It has been discovered that appropriate placement of a plurality of tabs on each electrode (for example, by placing 4 to 12 tabs), rather than placing a single tab at one end of each electrode, can significantly reduce resistance and inductance of the cell. In one or more embodiments, the collector tabs are positioned so that adjacent induced current loops flow in opposing directions. The tabs may be displaced a set distance from the leading edge of the electrode sheet and, thereafter, are spaced evenly along the length of the electrode sheet. In some embodiments, the electrode includes 4-12 conductor tabs. The two electrodes may have a different number of tabs. For example, one electrode may have 4 tabs, and the other electrode may have 2 tabs. As is described in greater detail below with reference to FIGS. 11A and 11B, the displacement of the first tab a distance from the leading edges of the electrode provides desirable reduction in induced current and hence reduced the induced magnetic field.

FIGS. 10A and 10B illustrate tab position and current flow in a conventional wound cell. FIG. 10A views the rolled electrode from the rolled edge. FIG. 10B is a plan view of an unrolled electrode of the conventional cylindrically wound cell. In this wound cell, a single tab 1000 is placed at the end of an electrode, and current flows in the direction of 1010. When the cell is charged or discharged, current flow along the length of the electrode, leaving tab 1000 and traveling down the length of the electrode. When the electrode is rolled, as shown in FIG. 10A, current along the electrode flows in the counter-clockwise direction 1010. Therefore, the electrode acts as a coil, and the current that flows in the coil can induce a magnetic field along the along the axis of the coil, according to the well-known "right hand rule." This can result in a relatively large inductance in the wound cell. When anode and cathode sheets are wound into a cylindrical jelly roll according to this conventional arrangement, two coils are created. tron. The cells with eight tabs had an average inductance of 0.028 microH. In contrast, the commercially-available high-power cells with only one tab had an average inductance more than ten times larger (see Table 1 below).

TABLE 1

| Cell Type cell_ID | Instrument: Fluke PM6306 RCL meter; 2.0 V AC excitation; zero trim set at each frequency cell inductance (microH) at freqency, kHz (2.0 V AC excitation) | | | | | | Inductance (microH) Instrument: Solartron 1250 | no. of |
|---|---|---|---|---|---|---|---|---|
| All cells: TX-C-1 26650s | 1 | 4 | 10 | 25 | 50 | 100 | FRA, 5 mV | tabs |
| 4a5 | nm | 0.03 | 0.05 | 0.01 | 0.02 | 0.03 | | 4 |
| 3a1 | nm | 0.04 | 0.06 | 0.05 | 0.03 | 0.01 | | 4 |
| 3a2 | 0.02 | 0.06 | 0.04 | 0.02 | 0.02 | 0.02 | | 4 |
| 3a3 | nm | 0.06 | 0.04 | 0.03 | 0.03 | 0.03 | | 4 |
| 4a1 | nm | 0.06 | 0.05 | 0.02 | 0.03 | 0.02 | 0.024 | 4 |
| 4a4 | nm | 0.06 | 0.05 | 0.04 | 0.03 | 0.03 | 0.026 | 4 |
| 4b6 | nm | 0.06 | 0.05 | 0.02 | 0.03 | 0.02 | 0.029 | 8 |
| 4b4 | nm | 0.07 | 0.05 | 0.04 | 0.03 | 0.03 | 0.026 | 8 |
| Sony 18650VT | | 0.50 | | | | 0.68 | 0.433 | 1 |
| Sanyo 18650 LCO regular | | 0.45 | | | | 0.61 | 0.330 | 1 |
| Sony 18650VT | | 0.36 | | | | 0.63 | 0.336 | 1 |
| Valence 18650 IFR13N5 | | 0.48 | | | | 0.65 | 0.385 | 1 |

FIGS. 11A and 11B illustrate tab position and current flow in a wound battery according to one or more embodiments of the invention. FIG. 11A views the rolled electrode from the rolled edge. FIG. 11B is a plan view of an unrolled electrode of the wound battery. As shown, multiple tabs 1100 can be positioned along the electrode, and current flows in both directions (counter-clockwise 1140 and clockwise 1120, when the electrode is rolled) depending on the position relative to the nearest tab. In some embodiments, tabs 1100 may be spaced uniformly apart along the length of the electrode. Tabs 1100 can also be displaced a distance 1160 from the leading edges of the electrode. Distance 1160 is selected to be about one-half the spacing between adjacent tabs. These arrangements allow induced current flows (e.g., loops) to oppose one another in different layers of the jelly roll. As a result, the induced magnetic fields of the current flows can substantially cancel each other out. The locations of the plurality of conducting tabs can be selected such that net magnetic fields caused by induced currents in the battery is reduce by at least 80% compared to having only a single conducting tab located at a leading edge of the anode sheet or the cathode sheet. In this manner, the inductance of the battery can be made significantly lower.

In one embodiment, four tabs can provide significantly reduced inductance, as compared to one tab located at the end of the electrode sheet. However, increasing the number of tabs to, for example, more than 12, may result in a very limited inductance reduction and higher manufacturing costs. In some embodiments, the design can use fewer than four tabs. One tab in the middle of the electrode can serve a similar purpose and would result in a cell inductance lower than if the electrode had one tab at the end. In some embodiments, an electrode may have one tab per 50 cm$^2$ to 400 cm$^2$ area of the electrode sheet.

Figure 12:
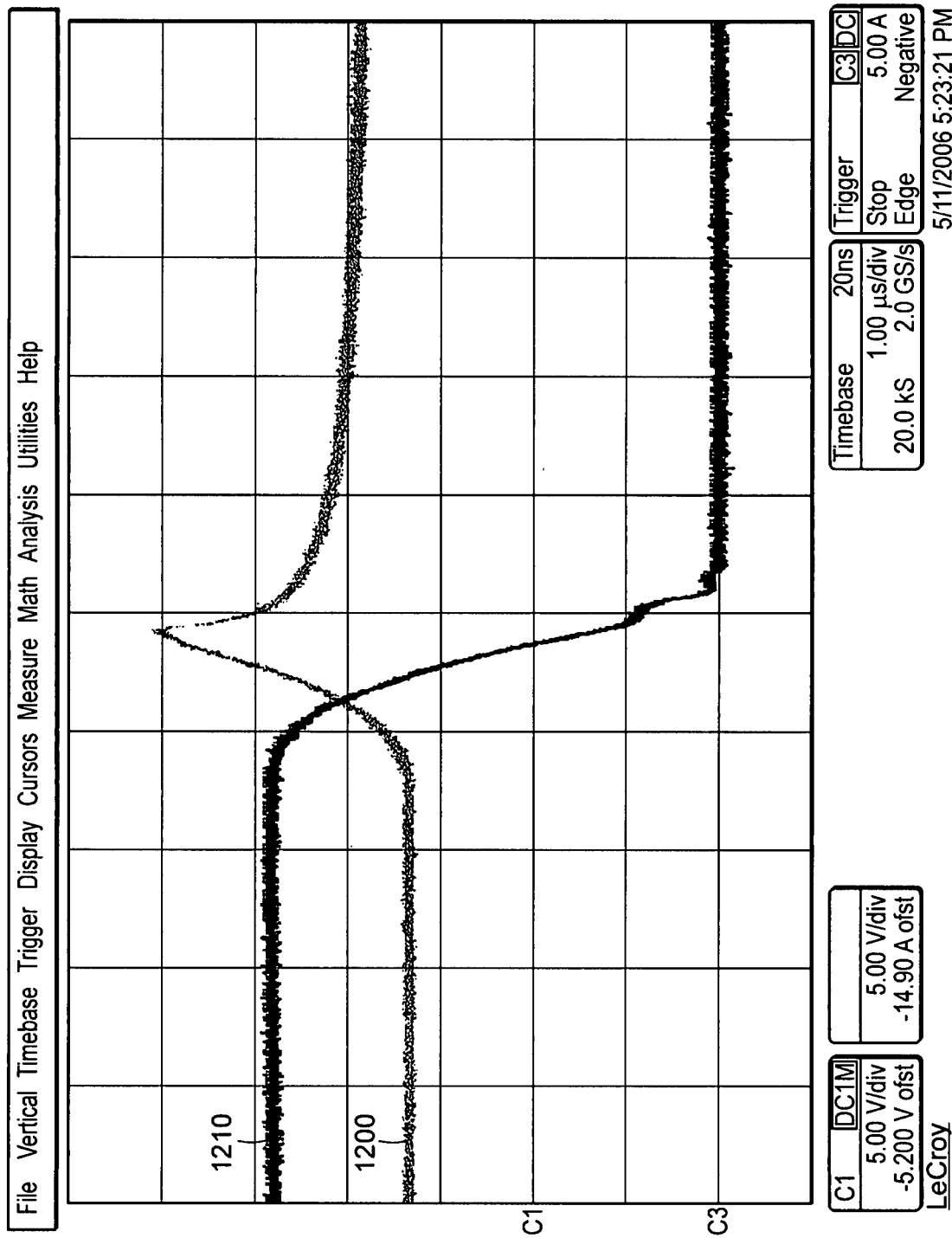
FIG. 12 shows a high-inductance battery's voltage and current waveforms.
Figure 13:
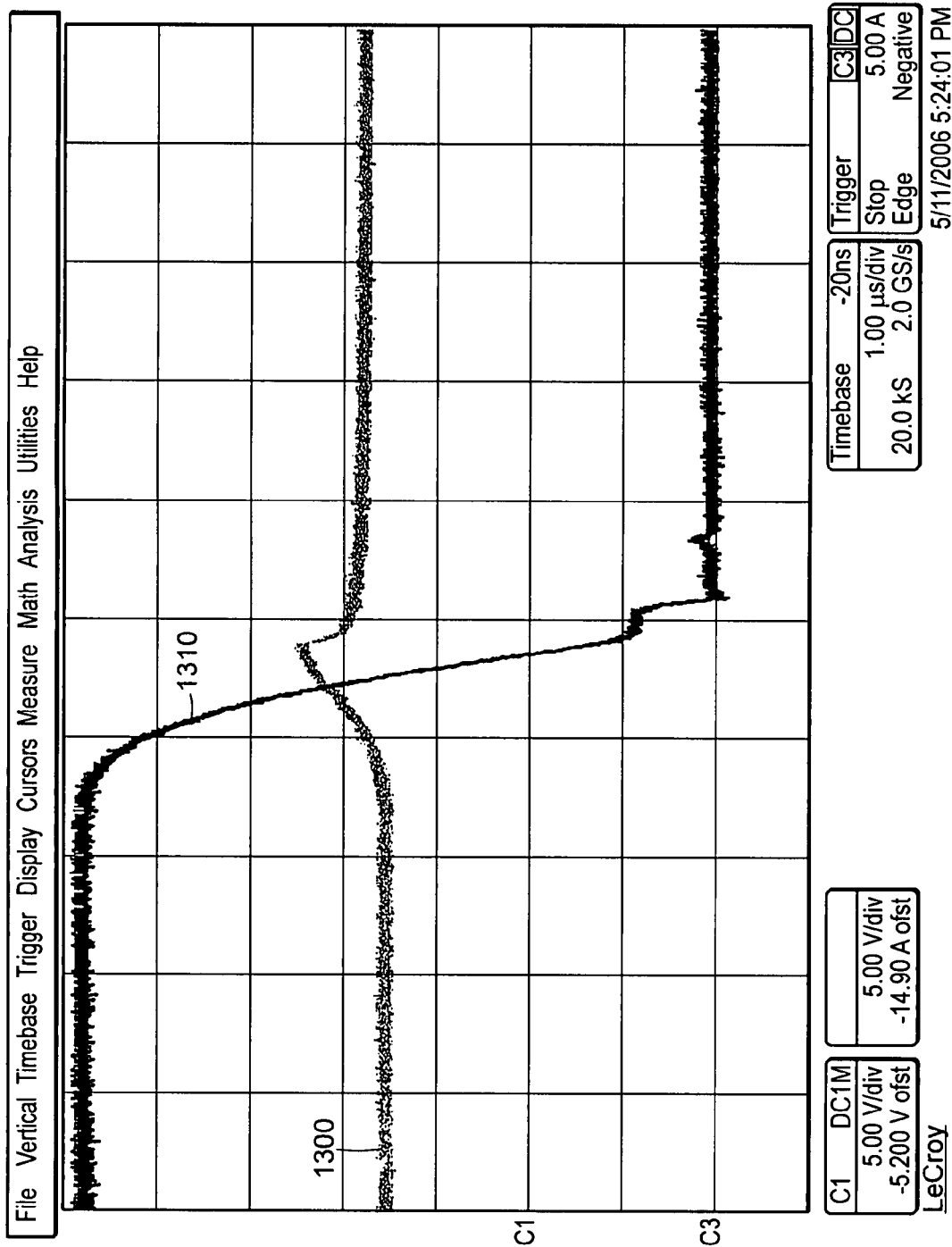
FIG. 13 shows a low-inductance battery's voltage and current waveforms.

To demonstrate the invention, several cylindrical-wound cells were made. These cells were 26 mm in diameter and 65 mm long, so-called "26650-sized" cells. These cells were made with both four and eight tabs, evenly spaced along the length of the electrode. For comparison, commercially-available cylindrical-wound cells of similar capacity were obtained. All cells had their inductance measured using two methods: (1) Fluke PM6306 RCL meter; and (2) Solartron 1250 frequency response analyzer. Using the Solartron frequency response analyzer, it was that the cells with four tabs had an average inductance of 0.025 microH using the Solar- FIGS. 12 and 13 illustrate how two different batteries with different inductances can demonstrate different energy dissipation levels within an application. FIG. 12 shows a high-inductance battery's voltage 1200 and current 1210 waveforms. Notice that when the current trace 1210 starts to go down, at the point where the controller switches it off, that the voltage 1200 goes up. The rising voltage is a measure of the electromotive force that the magnetic field is pushing on the controller's circuitry in order to force its dissipation. The more energy there is to dissipate (and therefore, the higher the inductance), the higher this voltage will rise. The multiplication of this voltage and the current after the switch has turned off yields the exact energy being dissipated as useless heat. So, a higher voltage indicates a higher energy dissipation.

In FIG. 13, a low-inductance battery containing four or eight appropriately located tabs yields a much smaller voltage spike 1300 as the current 1310 falls to zero. This lower spike indicates a smaller amount of energy being dissipated inside the power controller circuitry than in the case of the higher inductance battery used in the experiment illustrated in FIG. 12.

As discussed in connection with FIG. 7A, positions of tabs can be selected so that the tabs are aligned within a specific region (e.g., a 90 degree quadrant) on a face of the wound cell. Selecting the positions of the tabs so that the tabs are evenly spaced along the length of the electrode can further reduce the resistance and inductance of the wound cell.

The basic idea and design of this battery cell can be applied to almost any battery cell with very few exceptions. Alternative designs may be developed that better fit specific applications, but the basic premise remains the same; this cell invention efficiently uses area and volume to create a robust, lightweight, and centrally symmetric battery ideal for both manufacturing and customer interface. The design can easily be modified to incorporate a steel housing instead of an aluminum housing by reversing the polarity of the internal components.

In one aspect, the rechargeable battery cell design described in this document has many advantages over conventional battery design in both end user application as well as cell manufacturing, namely, a centrally located power terminal and a centrally located electrolyte fill hole. Conventional cell designs use volumetrically inefficient crimp joining.

One aspect of the cell design allows the cell to be designed with the more volumetrically efficient welding seal between the end cap and can, while placing both the fill-hole and the power terminal directly in the same desirable location, directly in the center of the cell.

Additionally, by using two end caps and a tube instead of one end cap and a single ended can, a more robust and more manufacturable joint between the internal extension tabs and the battery terminals is achievable on both ends of the cell now instead of only one.

In one or more embodiment, the above design uses four tabs per electrode instead of the more common single tab. This vastly reduces the impedance of the cell as a whole, which is very important in high power applications.

In one or more embodiments, the cell utilizes the additional thickness of a power terminal to obtain features necessary for sealing the fill-hole with a plug, allowing the actual seal to be more robust while remaining unseen and unobtrusive to the cells outline.

The cylindrical cell according to one or more embodiments utilizes a nickel plate soldered to the aluminum housing. This allows the cells main housing to be manufactured from the light weight and electrically conductive aluminum. The terminals are made from the heavier, yet more corrosion resistant and more weld friendly Ni material.

The cell design also locates the vent score on the bottom of the cell. This opens up volume on the top of the cell that can be used for increasing the cell's energy storage capacity. The vent described in this design is unique in the fact that it is much larger than conventional vents and is located around the perimeter of power terminal as apposed to asymmetrically beside it or under it. This allows gasses and/or material to escape unimpeded during a dangerous internally high pressure event.

The invention claimed is:

1. A cylindrical electrochemical cell, comprising:
a spirally wound assembly comprising an anode sheet and a cathode sheet separated by separator membranes, the cathode sheet comprising a first electroactive layer on a first current collector, and the anode sheet comprising a second electroactive layer on a second current collector, the spirally wound assembly having a cylindrical side wall and opposing end faces,
wherein at least one of the first current collector and the second current collector is in electrical communication with a plurality of conducting tabs that extend from at least one of the anode sheet and the cathode sheet, the plurality of conducting tabs extending from an end face of the spirally wound assembly; and
wherein centers of the plurality of conducting tabs are spaced from each other in an annular direction around a center of the end face of the spirally wound assembly such that each of the plurality of conducting tabs are positioned within a 90 degree arc window.

2. The cylindrical electrochemical cell of claim 1, wherein the first current collector is in electrical communication with a first plurality of conducting tabs that extend from the cathode sheet, and the second current collector is in electrical communication with a second plurality of conducting tabs that extend from the anode sheet, wherein the first plurality of conducting tabs and the second plurality of conducting tabs extend from opposing end faces of the spirally wound assembly.

3. The cylindrical electrochemical cell of claim 1, wherein the plurality of conducting tabs are uniformly spaced along a length of at least one of the anode sheet and the cathode sheet.

4. The cylindrical electrochemical cell of claim 3, wherein the plurality of conducting tabs are located beyond a distance from leading edges of at least one of the anode sheet and the cathode sheet.

5. The cylindrical electrochemical cell of claim 1, wherein the plurality of conducting tabs comprise 4 to 12 tabs.

6. The cylindrical electrochemical cell of claim 1, wherein the first current collector is in electrical communication with a first plurality of 4 to 12 conducting tabs that extend from the cathode sheet, and the second current collector is in electrical communication with a second plurality of 4 to 12 conducting tabs that extend from the anode sheet.

7. The cylindrical electrochemical cell of claim 6, wherein the plurality of conducting tabs are uniformly spaced along a length of the at least one of the anode sheet and the cathode sheet.

8. The cylindrical electrochemical cell of claim 1, wherein the locations of the plurality of conducting tabs are selected such that net magnetic fields caused by induced currents in the cylindrical electrochemical cell is reduce by at least 80% compared to having only a single conducting tab located at a leading edge of the at least one of the anode sheet and the cathode sheet.

9. The cylindrical electrochemical cell of claim 1, wherein the plurality of conducting tabs are folded towards the center of the end face and intersect at a central axis.

10. The cylindrical electrochemical cell of claim 1, wherein the plurality of conducting tabs are of different lengths.

11. The cylindrical electrochemical cell of claim 10, wherein the lengths of the tabs are selected so that the ends of the tabs are aligned in a folded configuration.

12. The cylindrical electrochemical cell of claim 1, wherein the cylindrical electrochemical cell comprises 1 tab per 50 $cm^2$ to 400 $cm^2$ area of anode and cathode sheet.

13. The cylindrical electrochemical cell of claim 1, wherein the plurality of conducting tabs are secured to a connecting strap.

14. The cylindrical electrochemical cell of claim 13, wherein the connecting strap is electrically connected to a terminal of a case housing the spirally wound electrochemical assembly.

15. A cylindrical electrochemical cell, comprising:
a spirally wound assembly comprising an anode sheet and a cathode sheet separated by separator membranes, the cathode sheet comprising a first electroactive layer on a first current collector, and the anode sheet comprising a second electroactive layer on a second current collector, the spirally wound assembly having a cylindrical side wall and opposing end faces,
wherein at least one of the first current collector and the second current collector is in electrical communication with a plurality of 4 to 12 conducting tabs that extend from at least one of the anode sheet and the cathode sheet at an end face of the spirally wound assembly, and
wherein centers of the plurality of conducting tabs are spaced from each other in an annular direction around a center of the end face of the spirally wound assembly such that each of the plurality of conducting tabs are positioned in a 90 degree arc window.

16. The cylindrical electrochemical cell of claim 15, wherein the first current collector is in electrical communication with a first plurality of 4 to 12 conducting tabs that extend from the cathode sheet, and the second current collector is in electrical communication with a second plurality of 4 to 12 conducting tabs that extend from the anode sheet, wherein the first plurality of conducting tabs and the second plurality of conducting tabs extend from opposing end faces of the spirally wound assembly.

17. The cylindrical electrochemical cell of claim 15, wherein the plurality of conducting tabs are uniformly spaced along a length of at least one of the anode sheet and the cathode sheet.

18. The cylindrical electrochemical cell of claim 17, wherein the plurality of conducting tabs are located beyond a distance from leading edges of at least one of the anode sheet and the cathode sheet.

19. The cylindrical electrochemical cell of claim 15, wherein the locations of the plurality of conducting tabs are selected such that net magnetic fields caused by induced currents in the cylindrical electrochemical cell is reduce by at least 80% compared to having only a single conducting tab located at a leading edge of the at least one of the anode sheet and the cathode sheet.

20. The cylindrical electrochemical cell of claim 15, wherein the plurality of conducting tabs are folded towards the center of the end face and intersect at a central axis.

21. The cylindrical electrochemical cell of claim 15, wherein the plurality of conducting tabs are of different lengths.

22. The cylindrical electrochemical cell of claim 21, wherein the lengths of the tabs are selected so that the ends of the tabs are aligned in a folded configuration.

23. The cylindrical electrochemical cell of claim 15, wherein the cylindrical electrochemical cell comprises 1 tab per 50 $cm^2$ to 400 $cm^2$ area of anode and cathode sheet.

24. The cylindrical electrochemical cell of claim 15, wherein the plurality of conducting tabs are secured to a connecting strap.

25. The cylindrical electrochemical cell of claim 24, wherein the connecting strap is electrically connected to a terminal of a case housing the spirally wound electrochemical assembly.

26. A cylindrical electrochemical cell, comprising:
a spirally wound assembly comprising an anode sheet and a cathode sheet separated by separator membranes, the cathode sheet comprising a first electroactive layer on a first current collector, and the anode sheet comprising a second electroactive layer on a second current collector, the spirally wound assembly having a cylindrical side wall and opposing end faces,
wherein at least one of the first current collector and the second current collector is in electrical communication with a plurality of conducting tabs that extend from at least one of the anode sheet and the cathode sheet, the plurality of conducting tabs extends from an end face of the spirally wound assembly and wherein centers of the plurality of conducting tabs are spaced from each other in an annular direction around a center of the end face of the spirally wound assembly such that each of the plurality of conducting tabs are positioned within a 90 degree arc window; and
wherein the locations of the plurality of conducting tabs are selected such that net magnetic fields caused by induced currents in the cylindrical electrochemical cell is reduce by at least 80% compared to having only a single conducting tab located at a leading edge of the at least one of the anode sheet and the cathode sheet.

* * * * *